United States Patent [19]
Dugan

[11] Patent Number: 5,857,174
[45] Date of Patent: Jan. 5, 1999

[54] REAL ESTATE APPRAISAL METHOD AND DEVICE FOR STANDARDIZING REAL PROPERTY MARKETING ANALYSIS BY USING PRE-ADJUSTED APPRAISED COMPARABLE SALES

[76] Inventor: John W. Dugan, 911 Ridgefield Rd., Thibodaux, La. 70301

[21] Appl. No.: 975,448

[22] Filed: Nov. 21, 1997

[51] Int. Cl.$^6$ .................................................. G06F 17/60
[52] U.S. Cl. ................................................................ 705/1
[58] Field of Search .................................. 705/1, 10, 37

[56] References Cited

U.S. PATENT DOCUMENTS

| | | | |
|---|---|---|---|
| 5,361,201 | 11/1994 | Jost et al. | 705/35 |
| 5,414,621 | 5/1995 | Hough | 705/10 |
| 5,664,115 | 9/1997 | Fraser | 705/37 |

*Primary Examiner*—Edward R. Cosimano
*Attorney, Agent, or Firm*—Jacobson, Price, Holman & Stern, PLLC

[57] ABSTRACT

A real estate appraisal method in which the buyer of a property assigns points to a subject property and each comparable property based upon an Ideal Point System (IPS). The points assigned, or IPS values, are based upon the desirability factors for each of five categories of criteria. The total possible IPS value for any property is 100, corresponding to 100 per cent desirability. Once the buyer's IPS values are determined, the property may be subsequently used as a comparable property. The appraiser need only select a subject property and obtain IPS values for the subject property. The sales price of each comparable property is then adjusted based upon the relative difference between the IPS values for the comparable properties and the IPS values of the subject property, by dividing the total IPS value for each comparable property with the IPS value for the subject property to obtain a composite adjustment ratio. The adjustment ratio for each comparable property is then multiplied by the sales price to obtain an adjusted sales price. Any greatly divergent adjusted sales prices are discarded, and the average adjusted sales price is determined. The average adjusted sales price is used as the appraised value for the subject property.

14 Claims, 29 Drawing Sheets

PRE-ADJUSTED COMPARABLE SALE ANALYSIS

COMPARABLE SALE NO __1__

132 — INSPECTION DATE __May, 1991__

134 — PROPERTY SALE PRICE __$58,000__

HIGHEST & BEST USE – RESIDENCE — 136

110 Competitive desirability factors:  125  (I.P.S.)  BUYER  APPRAISER

| | | | | | | 140 | 142 |
|---|---|---|---|---|---|---|---|
| LOCATION 112 | Churches | Shopping | 138 | (10) | | 7 | 7 |
| To Center | Grade School | Parks | Business | | | | |
| Access | High School | Food Stores | Transportation | | | | |
| NEIGHBORHOOD 114 | Neighbors | Age Building | Trend Protection | (15) | | 9 | 8.5 |
| % Developed | Prestige | Price Range | Appearance | Congestion | | | |
| FACILITIES 116 | Sidewalk | Gas mains | TV Cable | (15) | | 8 | 8 |
| Frontage | Topography | Curbs | Electricity | Water Delivery | | | |
| Depth | Drainage | Storm Drains | Street Lights | Paper Delivery | | | |
| Area | Soil | Sewer Mains | Phone Service | Waste Collection | | | |
| Shape | Street | Water Mains | Mail Delivery | Police – Fire | | | |
| IMPROVED 118 | Entry | Closets | Carports | Plumbing | (35) | 27 | 27 |
| Size,LA/SF | Termites | Living Rm. | Baths | Orientation | Well | 125 | |
| Construction | Floors | Dining Rm. | Utility | Privacy | Septic Tank/Sewerage | | |
| Rooms | Ceilings | Family Rm. | Storage | Light | Walks | | |
| Roof | Insulation | Kitchen | Heating | Ventilation | Driveway Fruit | | |
| Ext. Walls | Int. Walls | Cabinets | Cooling | Plan | Walls Age Building | | |
| Windows | Doors | Equipment | Porches | Electrical | Fences Obsolescence | | |
| Foundations | Trim | Bedrooms | Patios | Hardware | Landscape Condition | | |
| UTILITY & APPEAL 120 | Situation | View | | (25) | | 19 | 20 |
| Zoning | Size | Trees | Elevation | Appearance | Parking | | |
| INFLUENCED 122 | History | Pressure | | (0) | | 0 | 0 |
| Market Trends | Furniture | Wide Offering | Informed | Demand | | | |
| Vacancy | Equipment | Typical Terms | Other Use | Competition | | | |

| | | | |
|---|---|---|---|
| TOTAL COMPETITIVE STANDARD'S RATIO = | (100) | 70 | 70.5 |
| APPRAISER'S CONCLUSION WAS | | | 70.5 |

130 / FIG. 6a  144  146

RESIDENCE COMPARABLE SALE

COMPARABLE SALE NO __1__

| | |
|---|---|
| Date of Sale: | May, 1991 |
| Location: | 308 West Thibodaux By-Pass Road, Thibodaux Louisiana |
| Vendor: | Homequity |
| Vendee: | Beth Melancon |
| Sale Price: | $58,000 |
| SF Living Area: | 1,724 SF |
| Unit Price (SF): | $33.64/SF |
| Land Size: | 75' x 125' |
| Remarks: | This comparable sale had 3 bedrooms, 2 baths, central a/c-heat, 2 car garage, front porch, covered rear patio, and private fence. |

PHOTOGRAPH

FIG. 6b

PRE-ADJUSTED COMPARABLE SALE ANALYSIS

COMPARABLE SALE NO __2__

INSPECTION DATE __April, 1991__     PROPERTY SALE PRICE __$64,900__

HIGHEST & BEST USE - RESIDENCE

| Competitive desirability factors: | | | | | (I.P.S.) | BUYER | APPRAISER |
|---|---|---|---|---|---|---|---|
| LOCATION | | Churches | Shopping | | (10) | | |
| To Center | Grade School | Parks | Business | | | 7 | 7 |
| Access | High School | Food Stores | Transportation | | | | |
| NEIGHBORHOOD | | Neighbors | Age Building | Trend Protection | (15) | | |
| % Developed | Prestige | Price Range | Appearance | Congestion | | 12.5 | 12 |
| FACILITIES | | Sidewalk | Gas mains | TV Cable | (15) | | |
| Frontage | Topography | Curbs | Electricity | Water Delivery | | | |
| Depth | Drainage | Storm Drains | Street Lights | Paper Delivery | | 12.5 | 12 |
| Area | Soil | Sewer Mains | Phone Service | Waste Collection | | | |
| Shape | Street | Water Mains | Mail Delivery | Police - Fire | | | |
| IMPROVED | | Entry | Closets | Carports | Plumbing | (35) | |
| Size,LA/SF | Termites | Living Rm. | Baths | Orientation | Well | | |
| Construction | Floors | Dining Rm. | Utility | Privacy | Septic Tank/Sewerage | | |
| Rooms | Ceilings | Family Rm. | Storage | Light | Walks | | |
| Roof | Insulation | Kitchen | Heating | Ventilation | Driveway Fruit | 27 | 27 |
| Ext. Walls | Int. Walls | Cabinets | Cooling | Plan | Walls Age Building | | |
| Windows | Doors | Equipment | Porches | Electrical | Fences Obsolescence | | |
| Foundations | Trim | Bedrooms | Patios | Hardware | Landscape Condition | | |
| UTILITY & APPEAL | | Situation | View | | (25) | | |
| Zoning | Size | Trees | Elevation | Appearance Parking | | 20 | 20.5 |
| INFLUENCED | | History | Pressure | | (0) | | |
| Market Trends | Furniture | Wide Offering | Informed | Demand | | 0 | 0 |
| Vacancy | Equipment | Typical Terms | Other Use | Competition | | | |
| TOTAL COMPETITIVE STANDARD'S RATIO = | | | | | (100) | 79 | 78.5 |
| APPRAISER'S CONCLUSION WAS | | | | | | | 78.5 |

FIG. 6c

RESIDENCE COMPARABLE SALE

COMPARABLE SALE NO 2

| | |
|---|---|
| Date of Sale: | April, 1991 |
| Location: | 1405 Park Drive, Thibodaux, Louisiana |
| Sale Price: | $64,900 |
| SF Living Area: | 1,567 SF |
| Unit Price (SF): | $41.57/SF |
| Land Size: | 100' x 95' |
| Remarks: | This comparable sale was a 3 bedrooms 2 bath home with a 2 car garage, front porch and open patio. The interior has cathedral ceilings in the family room, a wet bar and central air/heat. |

PHOTOGRAPH

FIG. 6d

PRE-ADJUSTED COMPARABLE SALE ANALYSIS

COMPARABLE SALE NO 3

INSPECTION DATE August 22, 1991           PROPERTY SALE PRICE $64,000

HIGHEST & BEST USE - RESIDENCE

| Competitive desirability factors: | | | | (I.P.S.) | BUYER | APPRAISER |
|---|---|---|---|---|---|---|
| LOCATION | Churches | Shopping | | (10) | | |
| To Center | Grade School | Parks | Business | | 7.5 | 7 |
| Access | High School | Food Stores | Transportation | | | |
| NEIGHBORHOOD | Neighbors | Age Building | Trend Protection | (15) | | |
| % Developed | Prestige | Price Range | Appearance | Congestion | 10 | 10.5 |
| FACILITIES | Sidewalk | Gas mains | TV Cable | (15) | | |
| Frontage | Topography | Curbs | Electricity | Water Delivery | | |
| Depth | Drainage | Storm Drains | Street Lights | Paper Delivery | 11.5 | 11 |
| Area | Soil | Sewer Mains | Phone Service | Waste Collection | | |
| Shape | Street | Water Mains | Mail Delivery | Police - Fire | | |
| IMPROVED | Entry | Closets | Carports | Plumbing | (35) | |
| Size,LA/SF | Termites | Living Rm. | Baths | Orientation | Well | |
| Construction | Floors | Dining Rm. | Utility | Privacy | Septic Tank/Sewerage | |
| Rooms | Ceilings | Family Rm. | Storage | Light | Walks | |
| Roof | Insulation | Kitchen | Heating | Ventilation | Driveway Fruit | 28 | 29.5 |
| Ext. Walls | Int. Walls | Cabinets | Cooling | Plan | Walls Age Building | |
| Windows | Doors | Equipment | Porches | Electrical | Fences Obsolescence | |
| Foundations | Trim | Bedrooms | Patios | Hardware | Landscape Condition | |
| UTILITY & APPEAL | Situation | View | | (25) | | |
| Zoning | Size | Trees | Elevation | Appearance | Parking | 21.5 | 20.5 |
| INFLUENCED | | History | Pressure | (0) | | |
| Market Trends | Furniture | Wide Offering | Informed | Demand | 0 | 0 |
| Vacancy | Equipment | Typical Terms | Other Use | Competition | | |
| TOTAL COMPETITIVE STANDARD'S RATIO = | | | | (100) | 78.5 | 78.5 |
| APPRAISER'S CONCLUSION WAS | | | | | | 78.5 |

FIG. 6e

RESIDENCE COMPARABLE SALE

COMPARABLE SALE NO __3__

| | |
|---|---|
| Date of Sale: | August 22, 1991 |
| Location: | 1152 West Camellia, Thibvodaux, Louisiana |
| Vendor: | Gary Drinkwater |
| Sale Price: | $64,000 |
| SF Living Area: | 1,769 SF |
| Unit Price (SF): | $36.17/SF |
| Land Size: | 70' x 103' |
| Remarks: | This comparable sale had 3 bedrooms, 1 1/2 baths. There was a small office off the family room. There was also a 2 car garage, front porch, covered patio and chain-link fence. The home had central air and heat. |

PHOTOGRAPH

FIG. 6f

PRE-ADJUSTED COMPARABLE SALE ANALYSIS

COMPARABLE SALE NO __4__

INSPECTION DATE __April 29, 1991__     PROPERTY SALE PRICE __$64,500__

HIGHEST & BEST USE - RESIDENCE

| Competitive desirability factors: | | | | (I.P.S.) | BUYER | APPRAISER |
|---|---|---|---|---|---|---|
| LOCATION Churches Shopping<br>To Center  Grade School  Parks  Business<br>Access  High School  Food Stores  Transportation | | | | (10) | 7.5 | 7.5 |
| NEIGHBORHOOD  Neighbors  Age Building  Trend Protection<br>% Developed  Prestige  Price Range  Appearance  Congestion | | | | (15) | 12.5 | 12 |
| FACILITIES  Sidewalk  Gas mains  TV Cable<br>Frontage  Topography  Curbs  Electricity  Water Delivery<br>Depth  Drainage  Storm Drains  Street Lights  Paper Delivery<br>Area  Soil  Sewer Mains  Phone Service  Waste Collection<br>Shape  Street  Water Mains  Mail Delivery  Police - Fire | | | | (15) | 11.5 | 12 |
| IMPROVED  Entry  Closets  Carports  Plumbing<br>Size,LA/SF  Termites  Living Rm.  Baths  Orientation  Well<br>Construction  Floors  Dining Rm.  Utility  Privacy  Septic Tank/Sewerage<br>Rooms  Ceilings  Family Rm.  Storage  Light  Walks<br>Roof  Insulation  Kitchen  Heating  Ventilation  Driveway  Fruit<br>Ext. Walls  Int. Walls  Cabinets  Cooling  Plan  Walls  Age Building<br>Windows  Doors  Equipment  Porches  Electrical  Fences  Obsolescence<br>Foundations  Trim  Bedrooms  Patios  Hardware  Landscape  Condition | | | | (35) | 26.5 | 27 |
| UTILITY & APPEAL  Situation  View<br>Zoning  Size  Trees  Elevation  Appearance  Parking | | | | (25) | 20 | 20 |
| INFLUENCED  History  Pressure<br>Market Trends  Furniture  Wide Offering  Informed  Demand<br>Vacancy  Equipment  Typical Terms  Other Use  Competition | | | | (0) | 0 | 0 |
| TOTAL COMPETITIVE STANDARD'S RATIO = | | | | (100) | 78 | 78.5 |
| APPRAISER'S CONCLUSION WAS | | | | | | 78.5 |

FIG. 6g

RESIDENCE COMPARABLE SALE

COMPARABLE SALE NO __4__

Date of Sale: April 29, 1991

Location: 1412 East Camellia Drive, Thibodaux, Louisiana

Vendor: Wayne Naquin

Vendee: Bob Chiasson, Jr.

Sale Price: $64,500

SF Living Area: 1,554 SF

Unit Price (SF): $41.51/SF

Land Size: 90' x 120'

Remarks: This 3 bedroom, 2 bath comparable has a 2 car garage, front porch, attached storage, fencing and central air and heat.

PHOTOGRAPH

FIG. 6h

PRE-ADJUSTED COMPARABLE SALE ANALYSIS

COMPARABLE SALE NO 5

INSPECTION DATE June, 1991          PROPERTY SALE PRICE $59,000

HIGHEST & BEST USE — RESIDENCE

| Competitive desirability factors: | | | | (I.P.S.) | BUYER | APPRAISER |
|---|---|---|---|---|---|---|
| LOCATION Churches Shopping<br>To Center  Grade School  Parks  Business<br>Access  High School  Food Stores  Transportation | | | | (10) | 8 | 7.5 |
| NEIGHBORHOOD  Neighbors  Age Building  Trend Protection<br>% Developed  Prestige  Price Range  Appearance  Congestion | | | | (15) | 10.5 | 11 |
| FACILITIES  Sidewalk  Gas mains  TV Cable<br>Frontage  Topography  Curbs  Electricity  Water Delivery<br>Depth  Drainage  Storm Drains  Street Lights  Paper Delivery<br>Area  Soil  Sewer Mains  Phone Service  Waste Collection<br>Shape  Street  Water Mains  Mail Delivery  Police – Fire | | | | (15) | 11 | 11 |
| IMPROVED  Entry  Closets  Carports  Plumbing<br>Size,LA/SF  Termites  Living Rm.  Baths  Orientation  Well<br>Construction  Floors  Dining Rm.  Utility  Privacy  Septic Tank/Sewerage<br>Rooms  Ceilings  Family Rm.  Storage  Light  Walks<br>Roof  Insulation  Kitchen  Heating  Ventilation  Driveway  Fruit<br>Ext. Walls  Int. Walls  Cabinets  Cooling  Plan  Walls  Age Building<br>Windows  Doors  Equipment  Porches  Electrical  Fences  Obsolescence<br>Foundations  Trim  Bedrooms  Patios  Hardware  Landscape  Condition | | | | (35) | 23.5 | 23.5 |
| UTILITY & APPEAL  Situation  View<br>Zoning  Size  Trees  Elevation  Appearance  Parking | | | | (25) | 18.5 | 19 |
| INFLUENCED  History  Pressure<br>Market Trends  Furniture  Wide Offering  Informed  Demand<br>Vacancy  Equipment  Typical Terms  Other Use  Competition | | | | (0) | 0 | 0 |
| TOTAL COMPETITIVE STANDARD'S RATIO = | | | | (100) | 71.5 | 72 |
| APPRAISER'S CONCLUSION WAS | | | | | | 72 |

FIG. 6i

RESIDENCE COMPARABLE SALE

COMPARABLE SALE NO 5

Date of Sale:   June, 1991

Location:   98 Diplomat Way, Thibodaux, Louisiana

Vendor:   Lea Rutter Builders

Vendee:   Richard McMillan

Sale Price:   $59,000

SF Living Area:   1,244 SF

Unit Price (SF):   $47.43/SF

Land Size:   54' x 129'

Remarks:   This comparable sale had 3 bedrooms, 2 baths, a carport, front porch, attached storage and central air and heat.

PHOTOGRAPH

FIG. 6j

SUBJECT'S D U P A A C S ANALYSIS
SUBJECT PROPERTY

132 — INSPECTION DATE March 18, 1992          134 — PROPERTY SALE PRICE to be estimated

HIGHEST & BEST USE – RESIDENCE

110 Competitive desirability factors:  (I.P.S.)  SELLER  APPRAISER

| | | | | | | | |
|---|---|---|---|---|---|---|---|
| 112 LOCATION To Center Access | Grade School High School | Churches Parks Food Stores | Shopping Business Transportation | | (10) | 8 | 8 |
| 114 NEIGHBORHOOD % Developed | Prestige | Neighbors Price Range | Age Building Appearance | Trend Protection Congestion | (15) | 10 | 10.5 |
| 116 FACILITIES Frontage Depth Area Shape | Topography Drainage Soil Street | Sidewalk Curbs Storm Drains Sewer Mains Water Mains | Gas mains Electricity Street Lights Phone Service Mail Delivery | TV Cable Water Delivery Paper Delivery Waste Collection Police – Fire | (15) 138 | 11 | 11 |
| 118 IMPROVED Size,LA/SF Construction Rooms Roof Ext. Walls Windows Foundations | Termites Floors Ceilings Insulation Int. Walls Doors Trim | Entry Living Rm. Dining Rm. Family Rm. Kitchen Cabinets Equipment Bedrooms | Closets Baths Utility Storage Heating Cooling Porches Patios | Carports Orientation Privacy Light Ventilation Plan Electrical Hardware | Plumbing Well Septic Tank/Sewerage Walks Driveway Fruit Walls Age Building Fences Obsolescence Landscape Condition | (35) 125 | 148 30 | 142 30 |
| 120 UTILITY & APPEAL Zoning | Size | Situation Trees | View Elevation | Appearance Parking | (25) | 19.5 | 19 |
| 122 INFLUENCED Market Trends Vacancy | Furniture Equipment | History Wide Offering Typical Terms | Pressure Informed Other Use | Demand Competition | (0) | 0 | 0 |
| TOTAL COMPETITIVE STANDARD'S RATIO = | | | | | (100) | 78.5 | 78.5 |
| APPRAISER'S CONCLUSION WAS | | | | | | | 78.5 |

FIG. 6k 131    149    146

SUBJECT PROPERTY DATA

Date of Inspection: March 18, 1992

Location: 405 Jefferson Drive, Thibodaux, Louisiana

Vendor: Leon Toups, Jr.

SF Living Area: 1,803 SF

Land Size: 83' x 125'

PHOTOGRAPH

FIG. 61

D U P A A C S RECONCILIATION AND SUBJECT'S VALUE ESTIMATE CONCLUSION

| Index | I.P.S. | SUBJECT | 1 | 2 | 3 | 4 | 5 |
|---|---|---|---|---|---|---|---|
| 110 SF Living Area 112 | — | 1,803 | 1,724 | 1,564 | 1,769 | 1,554 | 1,244 |
| Location 114 | 10 —138 | 8 | 7 —142 | 7 | 7 | 7.5 | 7.5 |
| Neighborhood 116 | 15 | 10.5 | 8.5 | 12 | 10.5 | 12 | 11 |
| Facilities 118 | 15 | 11 | 8 | 12 | 11 | 12 | 11 |
| Improved 120 | 35 | 30 | 27 | 27 | 29.5 | 27 | 23.5 |
| Utility & Appeal 122 | 25 | 19 | 20 | 20.5 | 20.5 | 20 | 19 |
| Influenced | — | 0 | 0 | 0 —146 | 0 | 0 | 0 |
| Total Standard Units | 100% | 78.5 | 70.5 | 78.5 —152 | 78.5 | 78.5 | 72.0 |
| Subject's Grade | | | 78.5 | 78.5 | 78.5 | 78.5 | 78.5 |
| Comp's Grade | | | 70.5 | 78.5 —154 | 78.5 | 78.5 | 72.0 |
| Composite Adj. | | | 1.11 | 1.00 | 1.00 | 1.00 | 1.09 |
| Comp Sale Price | | | x$58,000 | x$64,900 | x$64,000 | x$64,500 | x$59,000 |
| Subject's Values | | | $64,582 —156 | $64,900 | $64,000 | $64,500 | $64,310 |

Low was $64,000 —157
High was $64,900
Average was $64,458

Conclusion was (Rounded)  $64,500 "As is" —158

PRE-ADJUSTED COMPARABLE SALE ANALYSIS

COMPARABLE SALE  A

INSPECTION DATE  February 13, 1995         ACRE SALE PRICE  $28,812

HIGHEST & BEST USE — RURAL RESIDENTIAL ACREAGE

| Competitive desirability factors: | | | | (I.P.S.) | BUYER | APPRAISER |
|---|---|---|---|---|---|---|
| LOCATION  Churches  Business  To center  Grade School  Food Stores  Transportation  Access  High School  Shopping | | | | (30) | 25 | 25 |
| NEIGHBORHOOD  Price Range  Appearance  Protection  % Developed  Occupancies  Age  Trends | | | | (10) | 9 | 9 |
| FACILITIES  Moisture  Rocks  Sewer Mains  Phone Service  Frontage  Drainage  Springs  Streets  City Water  TV Cable  Depth  Soils  Ponds  Sidewalks  Electricity  Mail Delivery  Shape  Depth  Wet Areas  Curbs  Street Lights  Garbage Collection  Topography  Texture  Erosion  Storm Drains  Gas Mains  Police-Fire | | | | (30) | 22 | 22 |
| IMPROVED  Baths  Carports  Insulation  Walls  Fences  Pipelines  Kitchen  Roof  Interior  Yard Fencing  Wire  Elec. Lines  Cabinets  Exterior  Doors  Landscaping  Posts  Barns  Equipment  Windows  Electrical  Fruit Trees  Gates  Sheds  Storage  Foundation  Hardware  Age Buildings  Clearing  Stock Pens  Heating  Termites  Plumbing  Obsolescence  Pasture  Residences  Cooling  Floors  Septic Tanks  Condition  Wells  Bedrooms  Porches  Ceilings  Driveways | | | | (0) | 0 | 0 |
| UTILITY & APPEAL  Elevation  Restrictions  Appearance  Trees  Situation  View  Size  Zoning | | | | (30) | 23 | 23 |
| INFLUENCED  Other Use  Pressure  Competition  Extras  Fruit  Timber  Wide Offering  Informed  Equipment  Crops  Minerals  Typical Terms  Demand | | | | (0) | 0 | 0 |
| TOTAL COMPETITIVE STANDARD'S RATIO = | | | | (100) | 79 | 79 |
| APPRAISER'S CONCLUSION WAS | | | | | 79 | 79 |

FIG. 7a

SINGLE FAMILY RESIDENTIAL COMPARABLE SALE

COMPARABLE SALE    A

| | |
|---|---|
| Date of Sale: | February 22, 1995 |
| Location: | Highway 24, Gray, Louisiana 70359 |
| Vendor: | Benny Morgan, III |
| Vendee: | Eagle Wright Baptist Church, Inc. |
| Recordation: | |
| Sale Price: | $32,500 |
| Land Size: | 49,136 SF or 1.128 Acres |
| Dimensions: | 75.69 x 508.16' x 96' x 515.34' |
| Unit Price(AC): | $28,812/AC |
| Unit Price(SF): | $0.66/SF |

This is a portion of Lot 5 on Beatyville Plantation. It is the 2nd lot north of the intersection of Highway 24 and Highway 316.

FIG. 7b

PRE-ADJUSTED COMPARABLE SALE ANALYSIS

COMPARABLE SALE    B

INSPECTION DATE January 9, 1995          ACRE SALE PRICE  $28,020

HIGHEST & BEST USE – RURAL RESIDENTIAL ACREAGE

| Competitive desirability factors: | | | | (I.P.S.) | BUYER | APPRAISER |
|---|---|---|---|---|---|---|
| LOCATION | Churches | Business | | (30) | | |
| To center  Grade School | Food Stores | Transportation | | | 15 | 14 |
| Access  High School | Shopping | | | | | |
| NEIGHBORHOOD | Price Range | Appearance | Protection | (10) | | |
| % Developed  Occupancies | Age | Trends | | | 9 | 10 |
| FACILITIES  Moisture | Rocks | Sewer Mains | Phone Service | (30) | | |
| Frontage  Drainage  Springs | Streets | City Water | TV Cable | | | |
| Depth  Soils  Ponds | Sidewalks | Electricity | Mail Delivery | | 27 | 27 |
| Shape  Depth  Wet Areas | Curbs | Street Lights | Garbage Collection | | | |
| Topography  Texture  Erosion | Storm Drains | Gas Mains | Police-Fire | | | |
| IMPROVED  Baths | Carports | Insulation | Walls | (0) | | |
| Fences  Pipelines  Kitchen | Roof | Interior | Yard Fencing | | | |
| Wire  Elec. Lines  Cabinets | Exterior | Doors | Landscaping | | | |
| Posts  Barns  Equipment | Windows | Electrical | Fruit Trees | | | |
| Gates  Sheds  Storage | Foundation | Hardware | Age Buildings | | 0 | 0 |
| Clearing  Stock Pens  Heating | Termites | Plumbing | Obsolescence | | | |
| Pasture  Residences  Cooling | Floors | Septic Tanks | Condition | | | |
| Wells  Bedrooms  Porches | Ceilings | Driveways | | | | |
| UTILITY & APPEAL | Elevation | Restrictions | Appearance | (30) | | |
| Trees  Situation | View | Size | Zoning | | 28 | 28 |
| INFLUENCED | Other Use | Pressure | Competition | (0) | | |
| Extras  Fruit  Timber | Wide Offering | Informed | | | 0 | 0 |
| Equipment  Crops  Minerals | Typical Terms | Demand | | | | |
| TOTAL COMPETITIVE STANDARD'S RATIO = | | | | (100) | 79 | 79 |
| APPRAISER'S CONCLUSION WAS | | | | | 79 | 79 |

FIG. 7c

SINGLE FAMILY RESIDENTIAL COMPARABLE SALE

COMPARABLE SALE     B

| | |
|---|---|
| Date of Sale: | December 28, 1994 |
| Location: | Sugar Mill Road, Mathews, Louisiana |
| Vendor: | Twenty Seven Oaks, Inc. |
| Vendee: | Daniel Jambon |
| Recordation: | 1229/431 |
| Sale Price: | $26,000 |
| Land Size: | 40,419 SF or 0.928 Acres |
| Dimensions: | 180' x 218.16' x 180.46' x 230.94' |
| Unit Price(AC): | $28,020/AC |
| Unit Price(SF): | $0.64/SF |

This is tract 3 & 4 on Sugar Mill Road.

FIG. 7d

PRE-ADJUSTED COMPARABLE SALE ANALYSIS

COMPARABLE SALE     C

INSPECTION DATE  January 16, 1995          ACRE SALE PRICE  $20,957

HIGHEST & BEST USE – RURAL RESIDENTIAL ACREAGE

| Competitive desirability factors: | | | | (I.P.S.) | BUYER | APPRAISER |
|---|---|---|---|---|---|---|
| LOCATION | Churches | Business | | (30) | | |
| To center   Grade School | Food Stores | Transportation | | | 10 | 10 |
| Access      High School | Shopping | | | | | |
| NEIGHBORHOOD | Price Range | Appearance  Protection | | (10) | | |
| % Developed   Occupancies | Age | Trends | | | 8 | 8 |
| FACILITIES   Moisture | Rocks | Sewer Mains  Phone Service | | (30) | | |
| Frontage   Drainage   Springs | Streets | City Water   TV Cable | | | | |
| Depth      Soils      Ponds | Sidewalks | Electricity  Mail Delivery | | | 24 | 24 |
| Shape      Depth      Wet Areas | Curbs | Street Lights  Garbage Collection | | | | |
| Topography  Texture    Erosion | Storm Drains | Gas Mains    Police-Fire | | | | |
| IMPROVED      Baths | Carports | Insulation  Walls | | (0) | | |
| Fences    Pipelines   Kitchen | Roof | Interior    Yard Fencing | | | | |
| Wire      Elec. Lines  Cabinets | Exterior | Doors       Landscaping | | | | |
| Posts     Barns       Equipment | Windows | Electrical  Fruit Trees | | | | |
| Gates     Sheds       Storage | Foundation | Hardware    Age Buildings | | | 0 | 0 |
| Clearing  Stock Pens  Heating | Termites | Plumbing    Obsolescence | | | | |
| Pasture   Residences  Cooling | Floors | Septic Tanks  Condition | | | | |
| Wells     Bedrooms    Porches | Ceilings | Driveways | | | | |
| UTILITY & APPEAL | Elevation | Restrictions | Appearance | (30) | | |
| Trees    Situation | View | Size | Zoning | | 17 | 17 |
| INFLUENCED | Other Use | Pressure  Competition | | (0) | | |
| Extras     Fruit      Timber | Wide Offering | Informed | | | 0 | 0 |
| Equipment  Crops      Minerals | Typical Terms | Demand | | | | |
| TOTAL COMPETITIVE STANDARD'S RATIO = | | | | (100) | 59 | 59 |
| APPRAISER'S CONCLUSION WAS | | | | | 59 | 59 |

FIG. 7e

SINGLE FAMILY RESIDENTIAL COMPARABLE SALE

COMPARABLE SALE    C

| | |
|---|---|
| Date of Sale: | December 26, 1994 |
| Location: | Highway 55, Montegut, Louisiana |
| Vendor: | Carroll Pierre Naquin |
| Vendee: | Barry Bourgeois |
| Recordation: | 1445/313 |
| Sale Price: | $20,000 |
| Land Size: | 41,571 SF or 0.954 Acres |
| Dimensions: | 125' x 379.81' x 95' x 376.03' |
| Unit Price(AC): | $20,957/AC |
| Unit Price(SF): | $0.48/SF |

FIG. 7f

SUBJECT'S D U P A A C S ANALYSIS

SUBJECT PROPERTY

INSPECTION DATE <u>January 19, 1995</u>   ACRE SALE PRICE <u>to be estimated</u>

HIGHEST & BEST USE – <u>RURAL RESIDENTIAL ACREAGE</u>

| Competitive desirability factors: | | | | | (I.P.S.) | SELLER | APPRAISER |
|---|---|---|---|---|---|---|---|
| LOCATION | | Churches | Business | | (30) | 28 | 27 |
| To center | Grade School | Food Stores | Transportation | | | | |
| Access | High School | Shopping | | | | | |
| NEIGHBORHOOD | | Price Range | Appearance | Protection | (10) | | |
| % Developed | Occupancies | Age | Trends | | | 10 | 9 |
| FACILITIES | | Moisture | Rocks | Sewer Mains | Phone Service | (30) | |
| Frontage | Drainage | Springs | Streets | City Water | TV Cable | | |
| Depth | Soils | Ponds | Sidewalks | Electricity | Mail Delivery | 28 | 28 |
| Shape | Depth | Wet Areas | Curbs | Street Lights | Garbage Collection | | |
| Topography | Texture | Erosion | Storm Drains | Gas Mains | Police-Fire | | |
| IMPROVED | | Baths | Carports | Insulation | Walls | (0) | |
| Fences | Pipelines | Kitchen | Roof | Interior | Yard Fencing | | |
| Wire | Elec. Lines | Cabinets | Exterior | Doors | Landscaping | | |
| Posts | Barns | Equipment | Windows | Electrical | Fruit Trees | | |
| Gates | Sheds | Storage | Foundation | Hardware | Age Buildings | 0 | 0 |
| Clearing | Stock Pens | Heating | Termites | Plumbing | Obsolescence | | |
| Pasture | Residences | Cooling | Floors | Septic Tanks | Condition | | |
| Wells | Bedrooms | Porches | Ceilings | Driveways | | | |
| UTILITY & APPEAL | | Elevation | Restrictions | Appearance | (30) | | |
| Trees | Situation | | View | Size | Zoning | 28 | 28 |
| INFLUENCED | | | Other Use | Pressure | Competition | (0) | |
| Extras | Fruit | Timber | Wide Offering | Informed | | 0 | 0 |
| Equipment | Crops | Minerals | Typical Terms | Demand | | | |
| TOTAL COMPETITIVE STANDARD'S RATIO = | | | | | (100) | 94 | 92 |
| APPRAISER'S CONCLUSION WAS | | | | | | | 92 |

FIG. 7g

SUBJECT PROPERTY DATA

Date of Inspection: January 19, 1994

Location: Canal and St. Charles Streets, Lafourche Parish, Louisiana 70301

Vendor: The Grand Lodge of the State of La F&AM

Vendee: Dantin Motors, Inc.

Land Size: 43,560 SF or 1.000 Acre

Dimensions:

This is two lots adjacent to the Purchaser's property. One lot 0.450 fronts on St. Charles Street. The other (0.55 Acre) fronts on Canal Street.

FIG. 7h

D U P A A C S RECONCILIATION AND SUBJECT'S VALUE ESTIMATE CONCLUSION

| Index | I.P.S. | A | B | B | Subject |
|---|---|---|---|---|---|
| Acres | —— | 1.128 | 0.928 | 0.954 | 1.00 |
| Land Frontage | —— | 76' | 180' | 125' | —— |
| Land Depth | —— | 508' | 219' | 380' | —— |
| Location | 30 | 25 | 15 | 10 | 27 |
| Neighborhood | 10 | 9 | 9 | 8 | 9 |
| Facilities | 30 | 22 | 27 | 24 | 28 |
| Improved | 0 | 0 | 0 | 0 | 0 |
| Utility and Appeal | 30 | 23 | 28 | 17 | 28 |
| Influenced | 0 | 0 | 0 | 0 | 0 |
| Total Standard Units | 100% | 79% | 79% | 59% | 92% |
| Subject's Grade | —— | 92 | 92 | 92 | —— |
| Comp's Grade | —— | 79 | 79 | 59 | —— |
| Composite Adj. | —— | 1.16 | 1.16 | 1.56 | —— |
| Acre Sale Price | —— | x$28,812 | x$28,020 | x$20,957 | —— |
| Subject's Acre Values | —— | $33,442 | $32,503 | $32,693 | —— |

Low was       $32,503/AC
High was      $33,422/AC
Average was   $32,873/AC

Subject's Conclusion was (Rounded)       $33,000/Acre

Subject site had                          x  1.00 Acre

Subject's Land Value Estimate Indicated was       $33,000 "As is"

FIG. 7i

| | | |
|---|---|---|
| Residence, Waterfront | R/W | |
| Resort | Resort | |
| Site, Commercial, Central | S/CC | 10.05..15..35..35 SF |
| Site, Commercial, Drive-in | S/CD | 05.05..20..35..35 FF |
| Site, Commercial, Fringe | S/CF | 30.30..10..00..30 SF |
| Site, Industrial | S/I | 30.10..30..00..30 SF |
| Site, Marina | S/Mar | 30.30..10..00..30 WFF |
| Site, Motel | S/M | 30.10..30..00..30 A |
| Site, Office, Central | S/OC | 30.05..15..00..50 SF |
| Site, Office, Drive-in | S/OD | 30.05..15..00..50 FF |
| Site, Office, Fringe | S/OF | 30.30..10..00..30 SF |
| Site, Residence, Apartment | S/Rapt | 30.10..30..00..30 A |
| Site, Residence, Camp | S/RC | 30.30..10..00..30 FF |
| Site, Residence, Mobile Home | S/RMH | 25.20..20..00..35 FF |
| Site, Residence, Rural | S/RR | 25.10..30..00..35 A |
| Site, Residence, Suburban | S/RS | 30.10..30..00..30 FF |
| Site, Residence, Urban | S/RU | 30.10..30..00..30 FF |
| Site, Residence, Waterfront | S/RW | 25.15..30..00..30 A |
| Site, Service Station | S/Sta | 20.20..30..00..30 FF |
| Station, Service | Sta | 25.10..25..00..40 FF |
| | | 30.10..20..00..40 WFF |
| | | 20.05..10..25..40 FF |

FIG. 8b

REAL ESTATE APPRAISAL METHOD AND DEVICE FOR STANDARDIZING REAL PROPERTY MARKETING ANALYSIS BY USING PRE-ADJUSTED APPRAISED COMPARABLE SALES

BACKGROUND OF THE INVENTION

1. Field of the Invention

The present invention relates to a manual or computer-implemented method for appraising real estate. More particularly, the present invention relates to a computer-implemented method for accurately appraising real estate based upon a uniform scale which measures the desirability of the real estate to buyers and sellers.

2. Description of the Related Art

Property owners, prospective property purchasers, investors, insurance companies and lending institutions heavily rely upon the current value of a property to enact normal business operations. For real estate, the assessment of value, or appraisal, is typically done by a real estate appraiser. Real estate appraisers commonly base their judgment on any number of factors, such as the condition of the property, neighborhood reputation, and other considerations.

One common approach used to appraise real estate is called the Market Data Approach (MDA). This approach is an appraisal technique in which the market value estimate is based upon prices paid in actual market transactions and current listings. The actual sales prices operate to fix the lower limit of value in a static or advancing market, or as an upper limit in a declining market. The current listings, in contrast, set an upper limit in both advancing and declining markets. The MDA involves the process of correlating similar properties recently sold to determine the value of a subject property.

Quite notably then, one of the most important considerations in appraising real estate is the price of real estate of like design and size that have recently been sold in the same or a similar neighborhood as the "subject" property. These properties are referred to as "comparable" properties and are heavily relied upon by appraisers. For clarity then, the term "subject property" refers to a property under investigation and for which an appraisal value is to be determined. The term "comparable property", on the other hand, refers to a property, other than the subject property, that is used to assist in appraising the subject property.

In the market or sales comparison approach, the appraiser arrives at an indication of value by comparing the subject property directly with each selected comparable competitive property recently sold. The appraiser compares each of the comparable property's important attributes with the corresponding ones of the property being appraised, under the general distinctions of time, location, and physical characteristics considering all dissimilarities in terms of their probable effect upon the sale price. If a significant item in the comparable property is superior to, or more favorable than, a subject property a minus (−) dollar adjustment is made, thus reducing the indicated value of the subject; if a significant item in the comparable property is inferior to, or less favorable than, the subject property, a plus (+) dollar adjustment is made, thus increasing the value of the subject.

The drawback in relying on recent sales of comparable properties, however, is that the market or sales price merely indicates the price paid for a property. Quite significantly, however, the market price alone does not reflect the conditions existing at the time of the sale, or the reasons a buyer had in purchasing the property.

Hence, the accuracy and reliability of appraisal techniques that rely on sales price, such as the MDA system, is highly dependent upon the degree of comparability of each property with the subject property, the time at which the sale was made, the accuracy of the sale data, and the absence of unusual conditions affecting the sale, as well as other potentially influencing factors. Appraisers try and select comparable properties that have the most similarity with the subject property.

However, it would be extremely time consuming and inefficient for the appraiser to inspect each comparable property and make an explicit determination as to just how similar a comparable property is to the particular subject property under investigation. This is especially true where multiple comparable properties are involved.

In addition, an appraiser would need to re-analyze the sale value of a comparable property for each subject property being investigated. Thus, if a comparable sale is used with 10 different subject properties, then 10 separate direct comparisons of the computer sale would have to be made. Consequently, appraisers do not normally investigate comparable properties in order to determine just how relevant the sale price is to the subject property.

Nonetheless, appraisers attempt to base an appraisal on the price a typical buyer and a typical seller would agree upon as a fair value for the property. Clearly then, one drawback of these prior appraisal systems is that the factors used to appraise the property are subjective in nature. Thus, there will necessarily be a disparity in appraisal values amongst appraisers having different skill levels and biases.

Recently, appraisers have been making use of computer-generated models to facilitate the valuation of a subject property. One common computer-implemented system is referred to as Artificial Intelligence or just AI. The AI system obtains sales data from a national database and generally provides an analysis of public records data, recent sales, and other proprietary information of real estate within the zip code of the subject property.

Though the AI system is efficient time-wise, the computer system in general does not take into consideration an inspection of the subject property, or the opinion of an appraiser. Rather, the generated appraisal value is based strictly upon property information such as number of rooms, year constructed, and square footage. In addition, without objective data gathered on-site, the AI system increasingly relies on past predictions to generate the next series of predictions, so that appraisals become progressively more inaccurate.

Consequently, the neighborhood, upgrades, view, condition, amenities, and other important factors, are not worked into the appraised real estate value. Hence, the current AI system is generally inconclusive and unreliable, especially absent an inspection of the subject or comparable properties. Accordingly, the AI system only has a limited value where the subject property is in a substantially homogeneous location. Hence, a subject property that is in very good condition will tend to be under-valued. Likewise, properties that are in need of work or have other difficulties, such as limited functional use, will tend to be over-valued.

A computer-implemented real estate appraisal system is also shown in U.S. Pat. No. 5,361,201 to Jost, et al. (herein, Jost). In Jost, the computer is provided with property data describing the subject property and the area in which the subject property is located. Jost uses a neural-network approach to generate a report containing an appraised value for the subject property based upon the property data. Jost does not, however, use objective data gathered on-site or otherwise adjust the prices of comparable properties in appraising a subject property.

Accordingly, the prior appraisal systems and methods simply provide a prioritized rank or ordinal scale of various comparable properties in relation to the subject property. That is, the appraiser may indicate that one comparable property is more valuable than another comparable property or the subject property. However, this type of ranking does not indicate how much better one property is than another property. That is, there is no comparative valuation for the comparable properties with the subject property.

Another computer-implemented method for determining comparative values of comparable properties is shown in U.S. Pat. No. 5,414,621 to Hough. Hough determines values of comparable properties based on an assessment of percentages and sales of the comparable properties, and relying primarily on property tax rates of the respective properties. The derived comparable property values are then used to determine a value for a subject property.

As with other traditional appraisal methods, however, Hough does not consider the values of the buyers or sellers in appraising either the comparable properties or the subject property. This deficiency is significant, especially when one considers that the price of the property is highly dependent upon the demands of the prospective purchaser.

SUMMARY OF THE INVENTION

In order to overcome the disadvantages of the prior art, the present invention recognizes that the price of real estate is significantly based upon the price a prospective buyer is willing to pay and the seller is willing to accept. This price, in turn, is directly dependent upon the benefits or advantages a subject property has to that individual buyer. Clearly, any given property will have different advantages to different purchasers.

Unfortunately, the purchaser "values", or competitive desirability factors, are often unknown to appraisers. Thus, consumers are likely to have purchased property for reasons that differ greatly from the grounds for which the property has been appraised. Moreover, each comparable property will necessarily have different competitive desirability factors than the subject property. Thus, price is directly dependent upon benefits to a particular buyer, whereas value is based upon desireability factors of typical buyers and sellers.

Without knowledge of the desirability factors for the subject and comparable properties, it is difficult to accurately appraise real estate. The listed purchase price for a given property will not alone be useful in determining the true market value for the subject property. Rather, the appraisal system must indicate why one property differs from another in order to accurately determine an appraised value for a subject property.

For instance, consider a family of a certain size looking for a three-bedroom house. The buyer is not interested in four-bedroom houses. Nonetheless, appraisers typically consider four-bedroom houses to be comparable properties in setting the price of the subject property. Yet, the buyer would not consider the four-bedroom house to be comparable and would not be willing to pay the price for the extra room. Thus, to set a realistic appraised value for the subject property, the price of four-bedroom houses should be adjusted in accordance with the buyer's "values" and to take into consideration the buyer's desirability factors to derate the fourth bedroom to reflect the fact that the typical buyer won't pay for it. If typical buyers want three-bedroom houses then the appraiser usually makes a large adjustment for the fourth bedroom which is considered an over improvement of this property when compared with the typical three-bedroom house.

Accordingly, the present invention adjusts the sales prices of each comparable property prior to deriving an appraised value for the subject property. The adjusted value of each comparable property is based upon DUPAACS (Dugan's Pre-Adjusted Appraised Comparable Sales Method for Standardizing Real Property Market Analysis) an Ideal Point System (IPS) for various groups of desirability factors. Points are assigned to each of the comparable and subject properties. An adjusted sales price for each comparable property is determined based upon the points allocated the comparable property in relation to the points assigned to the subject property. The adjusted sales price of each comparable property is then used to determine an appraised value for the subject property.

Once points have been assigned, the adjusted sales price is readily established for the comparable properties. This is highly unlike traditional valuation methods, where sales prices of comparable properties are typically compared directly with the subject property, without first adjusting the sale price, and despite the comparable properties not being newly appraised and not reflecting the desirability factors of the buyer. The Ideal Point System also makes it easier for the appraiser to determine which properties are comparable to the subject property without having identified the subject property at the time of valuing comparable properties.

Accordingly, it is a primary object of the present invention to provide a real estate appraisal method that is highly efficient and trustworthy and can be relied upon by sellers, buyers, appraisers, bankers, investors and the like.

It is another object of the invention to provide a real estate appraisal method based upon the value a potential buyer places on the property.

It is a further object of the invention to provide a real estate appraisal method that is unbiased and based upon independent information.

Another object of the invention is to provide a computer-implemented appraisal method that generates standard appraisal reports.

Another object of the invention is provide an appraisal method that is implemented on a computer and can be interfaced with standard databases providing sales data, and that can download appraisal reports to other computer systems.

It is yet another object to provide an appraisal method that can be used for all real estate markets, including commercial or retail space, office space, and residential housing.

It is another object of the invention to provide a real estate appraisal method that sets standardized, objective, and well-defined factors used to appraise property so as to be easily understood and applied.

It is another object of the invention to adjust the market price of a comparable property against ideal standards of a buyer to more accurately compare subject properties by standardizing the analysis of pre-adjusted comparable sales.

It is another object of the invention to provide objective values for a comparable property so that the sales price of a comparable property may be easily adjusted for various subject properties and to provide repeatable standards.

In accordance with these objectives, a real estate appraisal method is devised in which the appraiser and the prospective buyer of a property assign points based upon an Ideal Point System (IPS). The points assigned, or IPS values, are based upon the desirability factors for each of five categories of elements. The total possible IPS value for any property is 100, corresponding to 100 per cent desirability.

Once the IPS values are determined, the property may be subsequently used as a comparable property. The appraiser need only select a subject property and obtain the IPS values for the seller of the subject property. The sales price of each comparable property is then adjusted based upon the relative difference between the total IPS value for the comparable properties and the total IPS values of the subject property.

In order to adjust the sales price of the comparative property, the comparative difference between the comparable property and the subject property is first assessed. This is done by dividing the total IPS value for each comparable property by the total IPS value for the subject property to obtain a composite adjustment ratio. The adjustment ratio for each comparable property is then multiplied by the sales price to obtain an adjusted sales price for that comparable property. Any greatly divergent adjusted sales prices are discarded, and the average adjusted sales price is determined. The average adjusted sales price for all of the comparable properties is used as the appraised value for the subject property.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 6a–6j are Pre-Adjusted Comparable Sale Analysis Forms used in the implementation of a first illustration of the preferred embodiment of the present invention having five comparable properties.

FIGS. 6k–6l are Pre-Adjusted Comparable Sale Analysis Forms used for the subject property in the first illustration of the invention.

FIG. 6m is an appraisal report based upon the Analysis Forms of FIGS. 6a–6l.

FIGS. 7a–7f are Pre-Adjusted Comparable Sale Analysis Forms used in the implementation of a second illustration of the preferred embodiment of the present invention having three comparable properties.

FIGS. 7g–7h are Pre-Adjusted Comparable Sale Analysis Forms used for the subject property in the second illustration of the invention.

FIG. 7i is an appraisal report based upon the Analysis Forms of FIGS. 7a–7h.

FIGS. 8a and 8b are a table serving as a guide for the weights to be assigned each of the categories shown in the slide of FIG. 2, as dependent upon the use classification of the property being appraised.

DETAILED DESCRIPTION OF THE PREFERRED EMBODIMENTS

Figure 1:
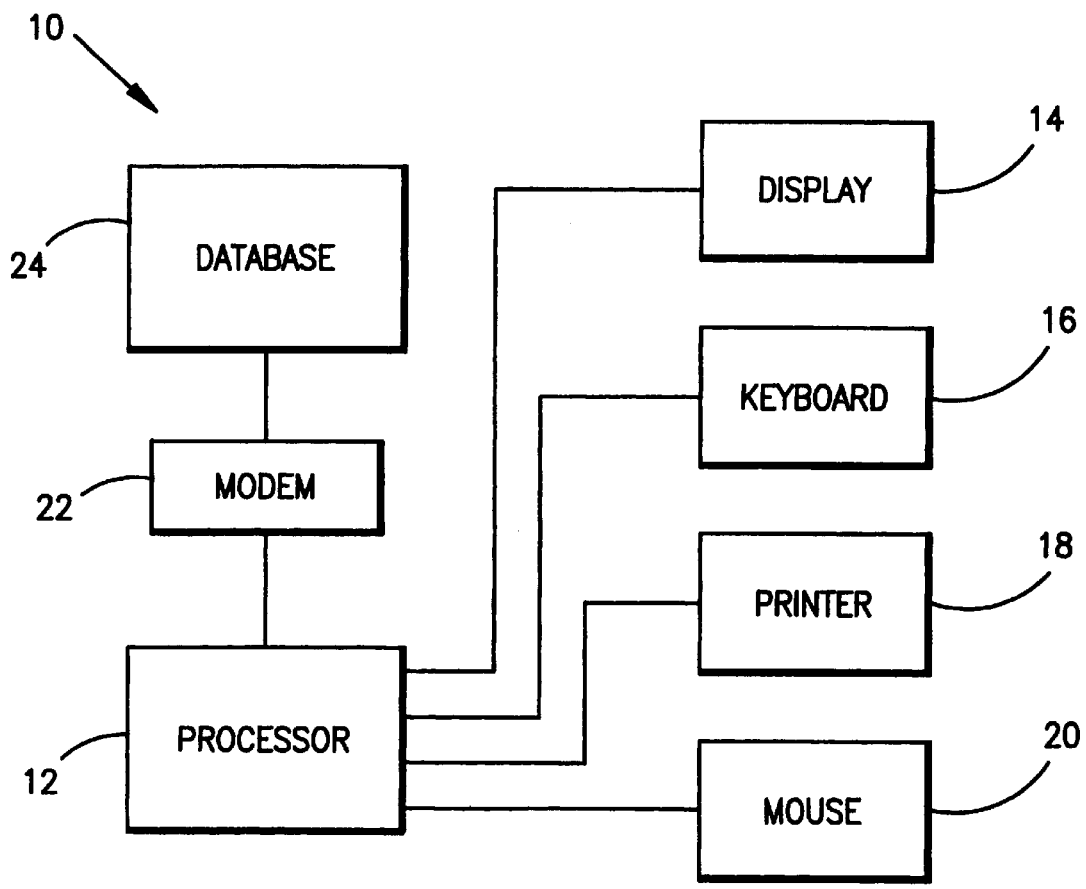
FIG. 1 is a block diagram of the preferred embodiment of the overall system of the present invention.

In describing a preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Now turning to the drawings, FIG. 1 shows the system 10 according to the present invention. The system 10 generally comprises a computer having a processor 12 connected with a display 14, keyboard 16, color printer 18, mouse 20 and modem 22. In addition, the processor 12 may be connected with a digital camera (not shown), so that photographs may be stored with an appraisal record and incorporated into appraisal reports.

The processor 12 is connected to a database 24. In the preferred embodiment, database 24 is a national database that provides sales data for real estate. Thus, the database 24 is maintained by an independent source, and therefore is located remote from processor 12. The database 24 is accessed via a communication medium, such as modem 22 or an Integrated-Service Digital Network (ISDN) connection (not shown). The connection may either be a direct modem connection or through the internet, such as by File Transfer Protocol, the World Wide Web, or by telnet.

In an alternative embodiment, however, database 24 may be located local to, and directly connected with, processor 12 in a stand-alone computer, such as by a CD-ROM. Still yet, the database 24 may be integrated with processor 12 in accordance with well-known computer processing configurations. In these alternative embodiments, the modem 22 connection is eliminated.

The display 14, keyboard 16 and mouse 20 are used to enter data and commands concerning the subject property and any comparable properties as becomes necessary. The entered data and commands are processed and implemented by processor 12, which then accesses information stored in database 24 via modem 22.

The system and method of the present invention is implemented by computer software which permits the accessing of data from computer database 24. The software is preferably stored within processor 12, though may be located at a remotely located processor (not shown), such as a processor that also retains database 24. Accordingly, the system 10 may be a single free-standing computer or a group of computers networked together, such as via the internet or by local networking.

The accessing of data from database 24 in accordance with the software instructions that implement the invention is performed in accordance with well-known processing techniques. In addition, the appraisal information generated by the system 10 may be downloaded to other remote computers through established communication protocols, such as by the nation-wide EDI (Electronic Data Interchange), for use by lending institutions and other establishments. This has particular use for underwriting systems, so that an appraisal report can be generated and electronically exchanged after an electronic credit analysis has been performed.

The analysis form provides a simple process for an appraiser to ascertain a buyer's values and desires in a subject or comparable property. As will become more apparent below, an analysis form is completed for each comparable property and placed into the database 24 for use with similar properties. The database 24 stores each property as a separate searchable record. The sales data for each property can then be compared with other sales for an ongoing indication of market values by each property, class, size, category, or other similar factors.

Figure 2:
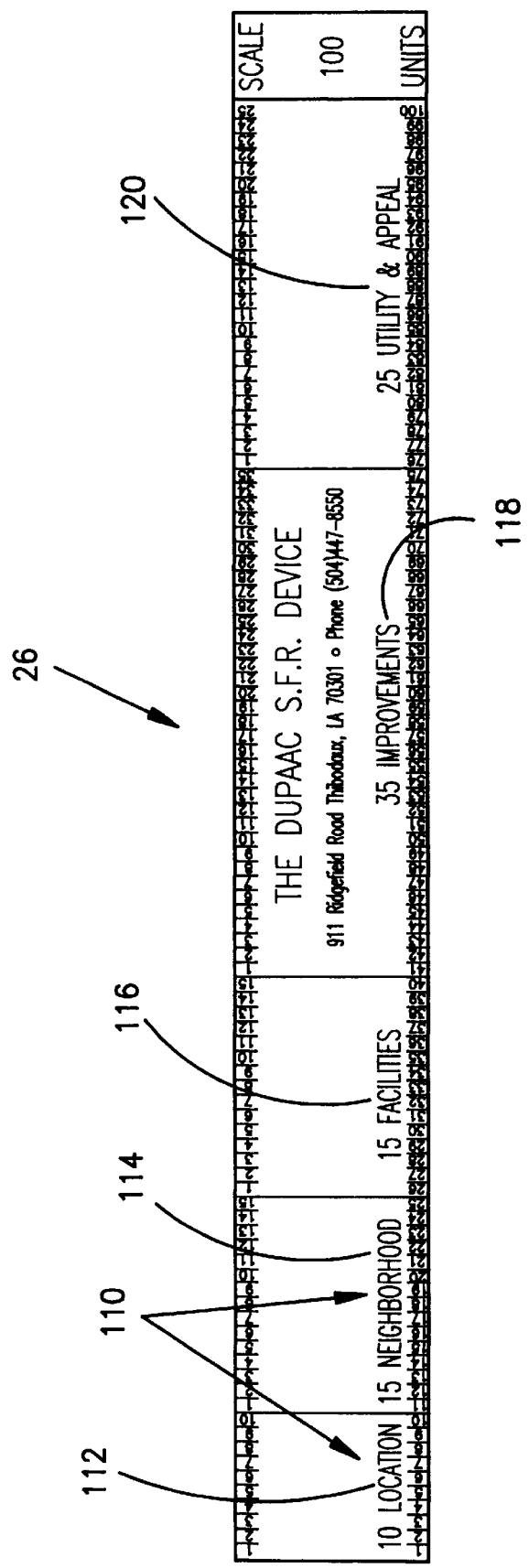
FIG. 2 shows an evaluation slide having categories and selectable Ideal Point System (IPS) values in accordance with the preferred embodiment of the present invention.

As shown in FIG. 2, a slide 26 is provided to present all the different categories 110, and respective points that may be assigned under the Ideal Point System (IPS) in a clear manner. The slide 26 assists in the assignment of points during evaluation of a comparable or subject property.

The weights or preferences are preferably arranged into five categories 110, including Location 112, Neighborhood 114, Facilities 116, Improvements 118, and Utility and Appeal 120. The first category, Location 112, reflects the location of the property, nearness to mass transportation services and major roadways, quality of schools and shopping, and so forth. In the preferred embodiment, Location 112 is assigned an IPS point value range of 1–10. The second category, Neighborhood 114, reflects the surroundings of the subject property, and the purchaser must select an IPS value from 1–15. The next category, Facilities 116, reflects such items as water mains, sewers, services, and similar items, and has an IPS value range from 1–15. The fourth category, Improvements 118, reflects things that are replaceable to a buyer at a cost, and has an IPS value range from 1–35. The last category, Utility and Appeal 120, reflects the contemplated uses of the property (that is, the motive for purchasing the property), and has an IPS value range from 1–25.

The five categories 110 represent the desirability for a subject property, for a possible total of 100 IPS value points. The buyer is able to indicate the relative values by selecting amongst the range of allowed IPS values for each category 110. Although the preferred embodiment uses five categories 110, additional categories may be factored in as well, such as external influences or pressures exerted on the buyer.

Figure 3:
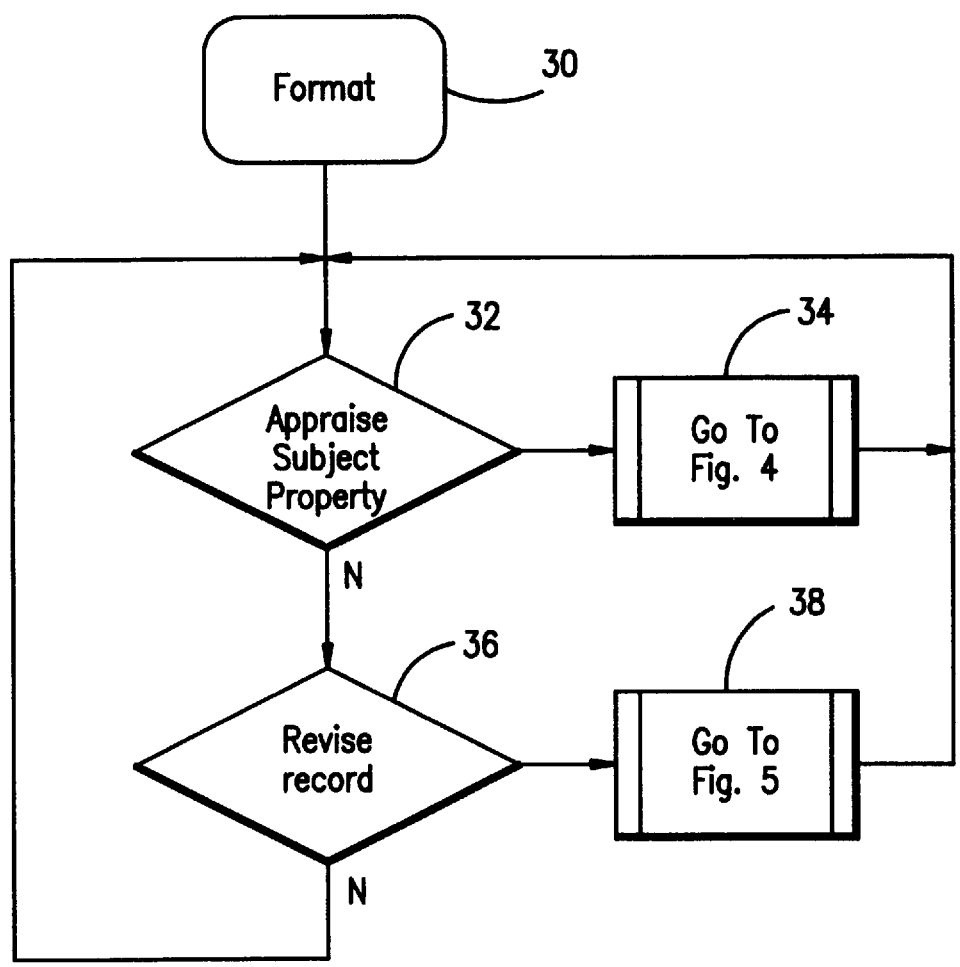
FIG. 3 is a general flow diagram of the overall operation of the system of FIG. 1.

Referring now to FIG. 3, the operation of the system 10 will now be described. The system 10 starts off at block 30, where the processor 12 formats itself, such as by booting up. Once the system 10 is formatted, step 30, the operator, here an appraiser, will have two options. The operator may appraise a subject property, step 32, or revise a record stored on the database 24, step 36. If the operator decides to appraise a subject property at step 32, the system 10 will proceed in the manner of the flow chart in FIG. 4, step 34. On the other hand, if the operator chooses to revise a record at step 36, the method described in the flow chart of FIG. 5 will be followed, step 38. The system 10 will await for the operator to choose one of these two options before continuing on.

Figure 4:
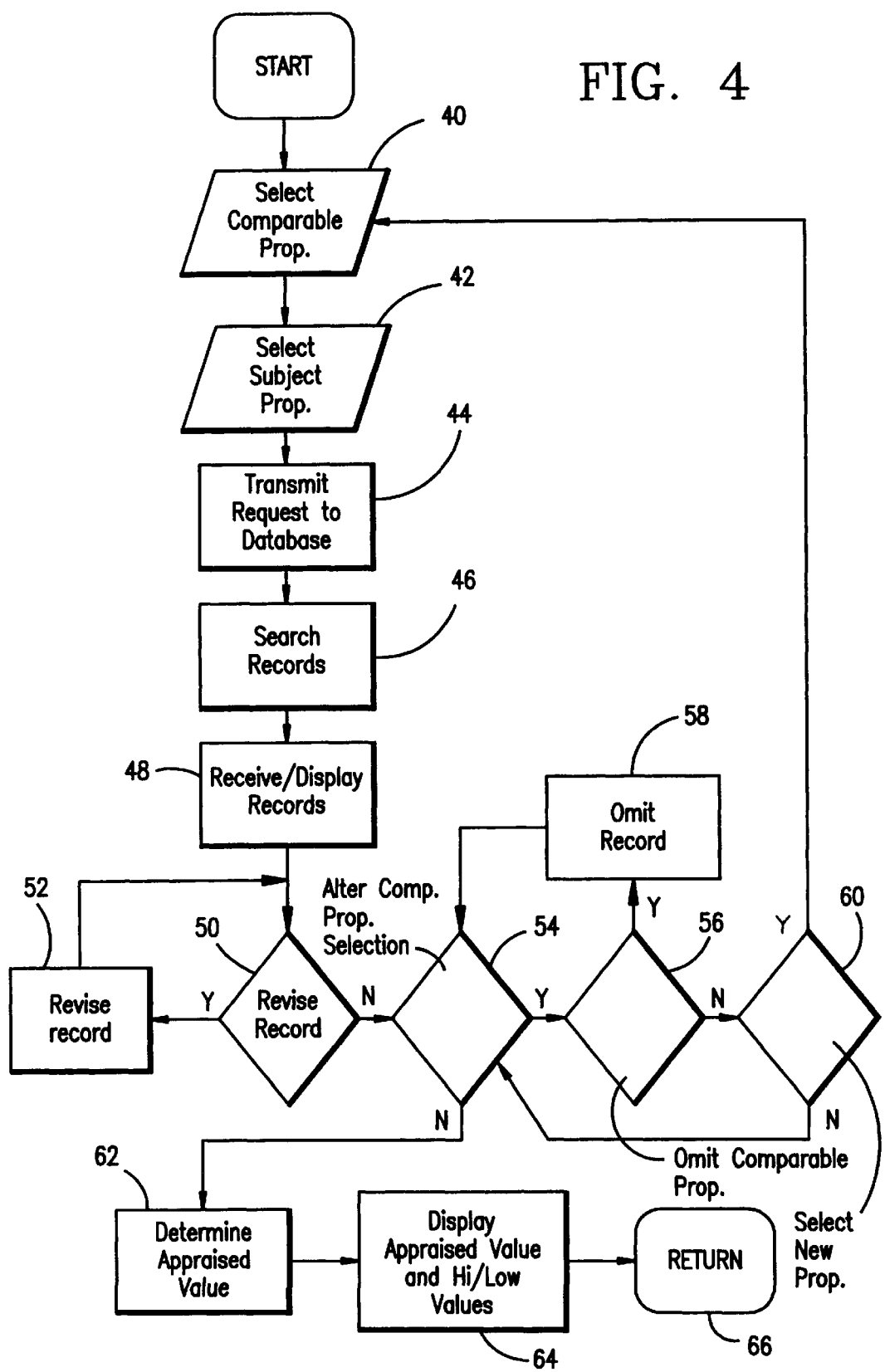
FIG. 4 is a flow diagram to appraise a subject property in accordance with the preferred embodiment of the present invention.

Assuming first that the operator selects to appraise a subject property, step 32, at which point the system 10 continues, at step 34, to step 40 of FIG. 4. At step 40, the operator must first select, by use of keyboard 16, mouse 20 and/or display 14, the comparable properties to be used in the appraisal. Here, the system 10 is preferably configured to require the operator to select a minimum of three comparable properties, but no more than five comparable properties. Alternatively, the system may be configured to suggest comparable properties based upon preferences of the subject property, such as location, facilities, or other information.

Once the comparable properties have been selected, step 40, the system 10 prompts the operator to select the subject property, step 42. Once both the subject property and the comparable properties have been selected by the user, the processor 12 will transmit, at step 44, the request to the database 24 via modem 22. Of course, the order in which the comparable properties and subject property are selected can be varied to any suitable manner. Preferably, however, the comparable and subject properties are selected prior to transmitting a request to the database, step 44. However, the subject property need not be selected until after comparable properties have first been received and displayed.

Once a request is received by the database 24, the records stored in the database 24 are searched, step 46. The results of the search are then transmitted from the database 24 back to processor 12, where they are received and displayed on monitor 14, step 48. Preferably, the records for each comparable property and the subject property are viewed independently and the operator may scroll from one record to the next.

Once the records for the subject and comparable properties are displayed, the operator has the option of revising the record, step 50. This may be done, for instance, if the record contains incorrect information. However, the record may also be revised to input a new set of IPS values, particularly geared to the subject property presently under analysis. As indicated above, and will be discussed more fully below, the IPS values are point values selected by a buyer, appraiser, or seller indicating the score of a property in accordance with an Ideal Point System (IPS).

Proceeding to step 54, once having displayed the different records, step 48, the operator may decide to revise the list of selected comparable properties. If the operator is satisfied with the comparable properties selected, the system will proceed to determine an appraised value, step 62. If, however, the user wishes to revise the comparable properties selected, the system proceeds instead to step 56. At step 56, the user may decide to delete one or more new comparable properties. The user selects the property or properties to be deleted, and the properties are then removed from the list, step 58. The omitted record, however, is not removed from the database 24, only from the current appraisal evaluation. The system then inquires whether the list is to be further revised, step 54.

If the user does not want to delete new properties, step 56, but instead wants to add a comparable property to the list, this may be done at step 60. If a new property is to be added, the system returns to step 40, where the user may select additional properties. Otherwise, the system returns back to step 54.

Once the selected records are to the appraiser's satisfaction, steps 50 and 54, the system 10 will determine the appraised value of the real estate, step 62. This appraisal is based upon a comparison of the total IPS value for each comparable property and the total IPS value of the subject property. The appraised value is displayed on monitor 14, along with a high and low appraised value, step 64. Once these values are displayed, the system returns, at step 66, to step 34 of FIG. 3. The operator will then again have the option to perform another appraisal, step 32, or revise a record, step 36.

Continuing with FIG. 3, now assume that the operator selects to revise a record, step 36. The system then proceeds, at step 38, to FIG. 5, where it continues at step 68. At step 68, the system 10 inquires whether the operator wishes to revise an existing record, or input a new record. As with steps 40–48, if the operator selects to revise an existing record, the operator selects the record. The request is transmitted by processor 12 to the database 24. The database 24 is searched, and the retrieved record is returned to processor 12, where it is displayed on monitor 14.

Once the record is displayed, the operator may decide not to revise the record, step 70, in which case the system 10 returns, at step 72, to step 38 of FIG. 3. If, however, the operator selects to revise the record at step 70, the revisions are entered, step 74. Once the revisions are complete, the program proceeds to step 78.

Likewise, if the operator decides to enter a new record into the database 24, step 68, the data is received by processor 12 at step 76. Essentially, the data input by the operator, at steps 76 and 74, will be information about the property, such as best use (for example, residence or business), location and size, information about the sale, such as sale price and date of sale, and the IPS values of the buyer, seller and/or appraiser involved in the sales transaction. Once the information has been input, the system proceeds to step 78.

At step 78, the processor 12 will add the individual IPS values for the property to derive a total IPS value. At this point, the system 10 cannot provide an adjusted sale price, since an adjusted sale price can only be determined after a subject property has been selected to be appraised. Thus, once the total IPS value has been determined, it is appended to the record, which is then transmitted by processor 12 to the database 24 via modem 22, step 80. The database 24 stores the record, step 82, and the system 10 returns to step 38 of FIG. 3, step 84.

A first example of an appraisal, for a single family residence in Thibodaux, La., is shown in FIGS. 6a–6m. Starting with FIG. 6a, a Pre-Adjusted Comparable Sale Analysis Form 130 is shown for a first comparable property. At the top of the Sales Analysis Form 130 is the date of inspection 132, the property sales price 134 and the highest and best use 136. The address (not shown) of the property may also be printed at the top of the Sale Analysis Form 130.

After the heading information, six categories 110 are listed, including the five categories previously described with respect to evaluation slide 26: Location 112; Neighborhood 114; Facilities 116; Improvements 118; and Utility and Appeal 120. Next to each category 110 is a list of illustrative competitive desirability factors 125. These desirability factors 125 allow the appraiser or buyer that is filling out the form, to have some indication as to what attributes of the comparable property is to be assessed for each particular category 110.

Under an Ideal Point System (IPS), each of the categories 110 are assigned a maximum percentage or maximum IPS value 138. The total of all the maximum IPS values 138 should preferably add up to a total of 100 percent. Thus, if the user were to rate the particular property as having the maximum IPS value 138 for each category 110, a total score of 100 points would be awarded that property.

An additional category 110, Influenced 122, is also included in analysis form 130. In the preferred embodiment, the category 110, Influenced 122, is assigned a maximum IPS value of zero since this category is not a common factor in the purchase of a house. However, points could be assigned under Influenced 122, giving a comparable property the potential of exceeding 100 total points.

Accordingly, a buyer assigns buyer IPS values 140 to each of the categories 110. This is preferably done at the time a buyer actually purchases the property. In order to eliminate bias of the buyer, the buyer IPS values 140 may be obtained prior to execution of a purchase agreement. At that time, the buyer would not want to falsely raise or lower his/her IPS values 140 since the appraised value of the property would be influenced prior to the sale. After purchasing the property, however, the buyer would stand to gain a higher appraised value without driving up his own purchase price.

Similarly, an appraiser assigns appraiser IPS values 142 to each of the categories 110. Preferably, the appraiser and buyer review the property together, and assign respective IPS values 140, 142 at the same time. The appraiser IPS values 142 are preferably based, at least in part, upon the buyer IPS values 140 in order to provide a basis for the sales price of that property.

Figure 5:
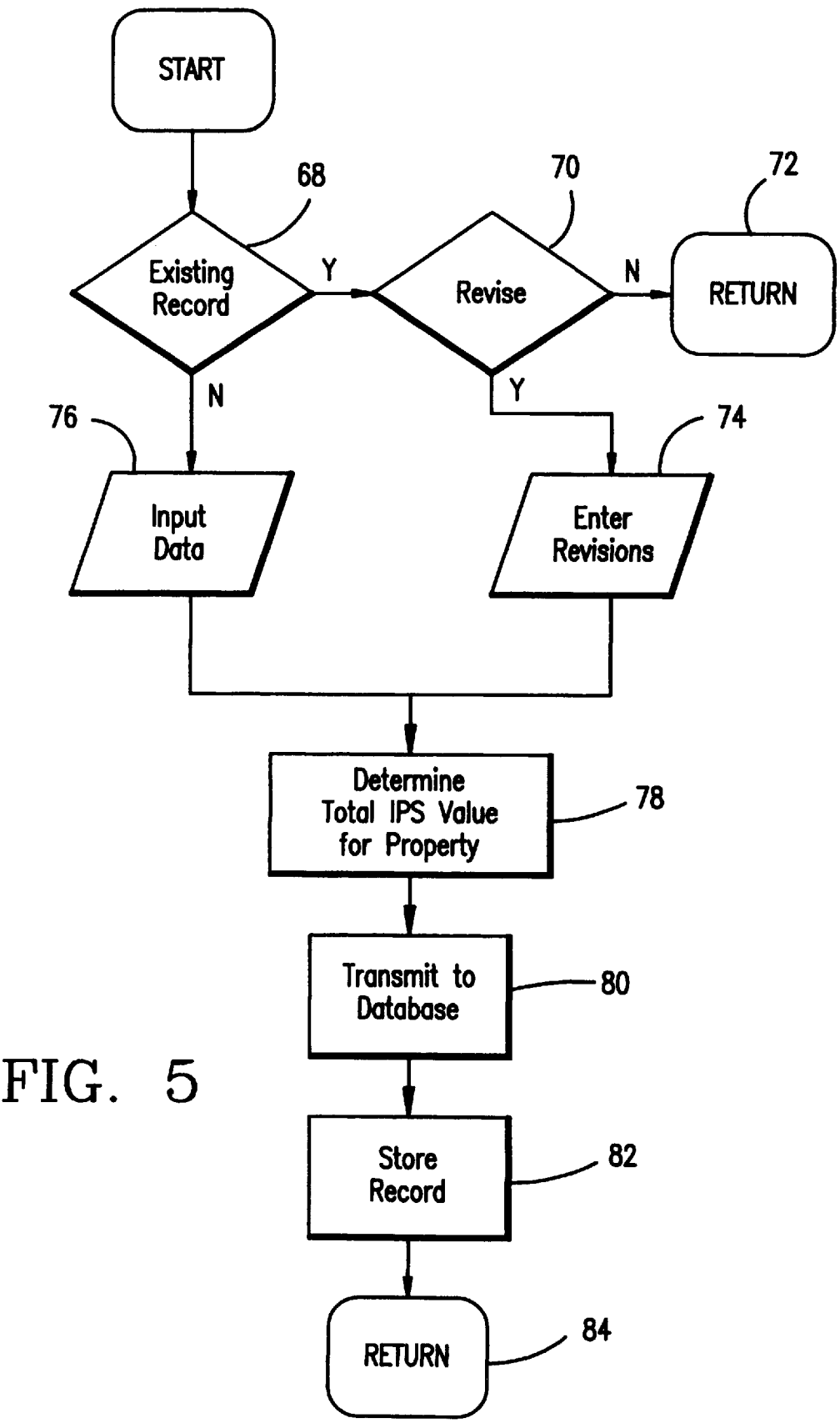
FIG. 5 is a flow diagram to revise a record stored in the database of FIG. 1.

After all of the buyer and appraiser IPS values 140, 142 are assigned, they are placed into the database 24 in accordance with the procedure of FIG. 5. Pursuant to step 78, the computer processor 12 sums the IPS values 140, 142 to derive a total competitive standard's ratio, or total buyer IPS value 144, and a respective total appraiser IPS value 146. The record is then transmitted to the database, step 80, where it is then stored, step 82, for later retrieval.

Preferably, on the reverse side of the Sale Analysis Form 130, or here shown in FIG. 6b, are further details of the comparable property. Preferably, the information provided includes date of sale, address or location, vendor, vendee, sale price, square footage of the living area, unit price of each square foot, land size, and a space for other remarks and photographs. The photographs are preferably created by a digital camera and may then be digitally stored in a record of the database 24. The unit price for each square foot is calculated by dividing the sales price by the total square footage of the living area.

The total buyer and appraiser IPS values 144, 146 are assessed for each of the comparable properties to be used in an analysis of the subject property. In the present example, five comparable properties are being used, and a Pre-Adjusted Comparable Sale Analysis Form 130 is completed for each of the comparable properties, as shown in FIGS. 6c–6j. All the information contained on the front and back of each Analysis Form 130 is stored in a single database record, each record corresponding to one property.

Similar to the Analysis Form 130, a Subject's DUPAACS (Dugan's Pre-Adjusted Appraised Comparable Sales method) Analysis form 131 is completed for the subject property, as shown in FIGS. 6k and 6l. Here, since the purpose of the analysis is to derive an appraised value for the subject property, the property sales price 134 is left blank or "To be estimated". Likewise, the unit cost of square footage living space is omitted. However, as with the Sale Analysis Forms 130 for the comparable properties, the appraiser total IPS value 146 is obtained.

In addition, the seller of the subject property completes the Analysis Form 131, indicating seller IPS values 148. The seller IPS values 148 are combined to form the total seller IPS values 149. The seller's IPS values 148 are obtained to provide an indication as to why the seller had purchased the subject property. And, the appraiser IPS values 146 are based, in part, upon the seller IPS values 148.

In practice, the analysis forms 130 for the comparable properties have been previously stored in the database 24. Thus, when a property is placed on the market, the appraiser need only review the property with the seller. The appraiser and seller together complete the subject property analysis form 131.

Once the Sales Analysis Form 131 has been completed for the subject property, the appraiser selects comparable properties to be used in the valuation of the subject property, step 40. In addition, the appraiser may also check the database 24 for a record containing the subject property, step 42. The appraiser and seller IPS values 146, 149 for the subject property can then be updated to reflect the current seller's IPS values, steps 50, 52.

After the subject and comparable properties are selected and retrieved, a DUPAACS Reconciliation and Subject's Value Estimate Conclusion, or Appraisal Report 150 is generated, as shown in FIG. 6m. Each of the comparable properties is listed, along with each category 110 and respective total appraiser IPS values 142 and appraiser IPS values 146.

Continuing at step 62, the appraised value of the subject property is determined. The total appraiser IPS value 146 of the subject property is taken to be the subject property's grade 152. The subject property's grade 152 is then independently divided by the total appraiser IPS value 146 for each of the comparable properties to derive a composite adjustment ratio 154 for those comparable properties. In the present example, for instance, comparable properties 1–5 have composite adjustment ratios 154 of 1.11, 1.00, 1.00, 1.00 and 1.09, respectively. The composite adjustment ratio 154 represents the relative value of the comparable property in respect to the other comparable properties.

After all of the composite adjustment ratios 154 have been determined, each individual composite adjustment ratio 154 is multiplied by the price for which the comparable property was actually sold. The product of these two values represents an adjusted sales price 156 for the comparable property. That is, the sales price adjusted to reflect the desirability factors 125 for the buyer and appraiser.

Finally, the high, low, and average adjusted sales price 157 for the comparable properties is determined. An appraised value 158 for the subject property is then based upon the calculated average adjusted sales price, keeping in mind the high and low adjusted sales prices. That is, any extreme value for the high and low adjusted sales price indicates that the property may not be comparable, and the value should be discarded or ignored. The system 10 may also compute the percentage spread between the high and low adjusted sales prices. The information is then displayed in the appraisal report 150, step 64.

As indicated in the description of FIGS. 6a–6m, the appraiser IPS values 146 were used to appraise the subject property. However, the IPS values for the prospective purchaser may be substituted for any of the buyer or seller IPS values 140, 148 in order to adjust the value of the actual sale to reflect the inclination of the prospective purchaser of the subject property. Thus, the value the prospective purchaser places on each of the comparable properties can be obtained, so as to determine the relative value the buyer has for the subject property.

FIG. 6m illustrates a standard appraisal report that is generated by the system 10. The appraisal report may show additional information, such as any property and report identifying numbers and the like. However, the system 10 may also generate Summary Appraisal Reports (SAR), which provide more limited information than the standard report. The SAR should provide at least the following information: (1) the property identification and summary description of the property; (2) the real property interest being appraised; (3) the purpose and intended use of the appraisal; (4) the value being estimated; (5) the effective date of the appraisal and date of report; (6) the extent of the process of collecting, confirming and reporting data; (7) all assumptions and limiting conditions that affect the analyses, opinions, and conclusions; (8) a summary of the information considered, appraisal procedures followed, and the reasoning which supports all the analyses, opinions and conclusions; (9) summary of the appraiser's opinion of the highest and best use of the real estate (when useful); (10) explanation of whether any of the usual valuation approaches have been excluded and reasons for the exclusion; (11) any additional information that may be appropriate to show compliance with, or permitted departures from, the specific guidelines.

Another example of the appraisal method is shown in FIGS. 7a–7j, for the appraisal of one acre of land at a rural site in LaFourche Parish, La. Here, three comparable properties, sales A, B, and C, are being used to assess the appraised value of the subject property. In addition, since the real estate to be appraised is land, the category Improved 118 is assigned a maximum IPS value 138 of zero. The points from Improved 118 are then distributed to the remaining categories 110, so that Location 112 has a maximum IPS value 138 of thirty (30) points, Neighborhood 114 has a maximum IPS value 138 of ten (10) points, Facilities 116 has a maximum IPS value 138 of thirty (30) points, and Utility and Appeal 120 has a maximum IPS value 138 of thirty (30) points.

In adjusting the sales price of the comparable properties, properties that are lower in value than the subject property are generally adjusted upward. This is because the total IPS values are likely to be depressed for the cheaper properties. The depressed total IPS values are indicative of the degree of similarity between the comparable properties and the subject property. If the subject property is similar in total IPS value to a comparable property, the adjusted sales price of the comparable property will be close to the actual sales price. As the total IPS values of the subject and comparable properties diverge, a greater adjustment will have to be made in the sales price of the comparable property.

Similarly, properties that are higher in sales price than the subject property generally are adjusted downwardly. This is because the comparable properties will be more desirable and have a higher total IPS value, though perhaps a comparable property is not affordable or otherwise available. In adjusting more desirable comparable properties downward and less desirable comparable properties upward, the adjusted sales prices tend to converge to within about 5% of each other, and usually to within 3% of each other.

The present invention mainly considers the productive attributes of real estate, such as physical, legal/regulatory, location and amenity characteristics. Other values that may be incorporated into an appraisal analysis include property productivity, market definition and cycles, demand analysis, supply analysis, comparison of supply and demand, and development of subject capture estimate.

Market analysis seeks to identify the highest and best use of a property in terms of market support (demand), timing (absorption rates), and market participants (probable users and buyers). For instance, where an analysis of market absorption reveals that a large number of properties are available in a market characterized by relatively stable demand, this circumstance indicates that there should be a reduction in the probable selling price of a subject property.

The adjusted sale price 156 for a comparable property is not, however, the same for all subject properties. Rather, the adjusted sale price 156 is a function of the total appraiser IPS value 142 for the subject property as related to the total appraiser IPS value 144 for each comparable property. As different subject properties come to the market, the appraisal IPS values 142 will also change.

In this manner, the adjusted sale price 156 for a given property is particular to the subject property being appraised. Hence, each time a new subject property is selected, a new adjusted sale price 156 will have to be determined for that comparable property. Thus, a comparable property will have a different adjusted price depending upon the similarity with a chosen subject property.

Yet, the appraiser will not have to re-investigate a comparable property in order to calculate an adjusted sales price as related to the new subject property. Rather, a standard "ideal property" is determined, against which each subjct property is measured. An ideal property is considered to be 100% desirable in each category. Thus, once the values of a comparable property are determined, those values may be used for different subject properties. Therefore, only the subject property has to be analyzed and appraised and the prior analysis of a comparable property is readily used for valuing each new subjet property.

By incorporating the buyer's value system directly into an appraisal of the comparable properties, the present system is able to provide an "interval-type" listing of properties. That is, not only can the comparable properties be ranked by priority, but there is an indication as to how much better one property is than another based upon the total IPS values 140, 142, 148. In so doing, the appraiser is able to immediately determine exactly how comparable a prior sale is to the subject property. Thus, the appraiser may adjust the price of comparable properties prior to deriving a value of the subject property so that a more realistic valuation can be determined.

The present invention preferably relies upon the appraiser's IPS values 142 from the comparable and subject properties. The appraiser evaluates the property based, in part, on the seller or buyer's IPS values, 140, 148 in order to best estimate the IPS values of a typical buyer or seller. Clearly, the actual buyer and seller IPS values 140, 148 could be used to calculate an adjusted sales price 156 and appraised value 158.

However, the buyer and seller IPS values 140, 148 only represent the values for that particular buyer and seller, and not necessarily the typical buyer and seller. As the property is repeatedly sold, a record of the seller IPS values 140 may be retained, and the average of these values could be used instead of the appraiser IPS values 142. Thus, the property value may be adjusted by, or measured against, ideal or objective standards before comparing one property to another. In addition, the system 10 stores the seller IPS values 148 in database 24, which may likewise be substituted for the appraisal IPS values 142 in appraising a subject property.

In the preferred embodiment of FIGS. 6a–6m and 7a–7i, there are generally five preferred categories 110, each having a predetermined weight. This system best accounts for the majority of properties classified as a residence (for FIGS. 6a–6m) or as a rural residential acreage (for FIGS. 7a–7i). However, the categories 110 and weights may be adjusted to better account for the various real estate markets, such as commercial, retail, and residential properties, as well as for various locations, such as rural, suburban, and urban properties. Moreover, any undesirable attributes may be accounted for by providing a category 110 and assigning negative points for those traits. Other attributes may be included such as age and condition of property. However, these factors typically are accounted for in the sale price of the property.

An example of an alternative embodiment is to have seven categories 110, weighted as follows: Location, 1–15; Surroundings, 1–15; Zoning, 1–10; Traffic, 1–10; Street Improvements and Services, 1–15; Lot Features, 1–15; and, Amenities and Trends, 1–20. Surroundings refers to the level of development for the area, age and price range of the homes, quality of neighbors, and the like. Zoning reflects any relevant land uses. Traffic accounts for safety, parking and accessibility. Street Conditions and Services reflects quality of gutters, curbs, sewer, water, fire protection, and the like. Lot Features include the size, topography, shape appeal, and landscaping. And, Amenities include, for instance, prestige, popularity, and competitive position.

Figure 8A:
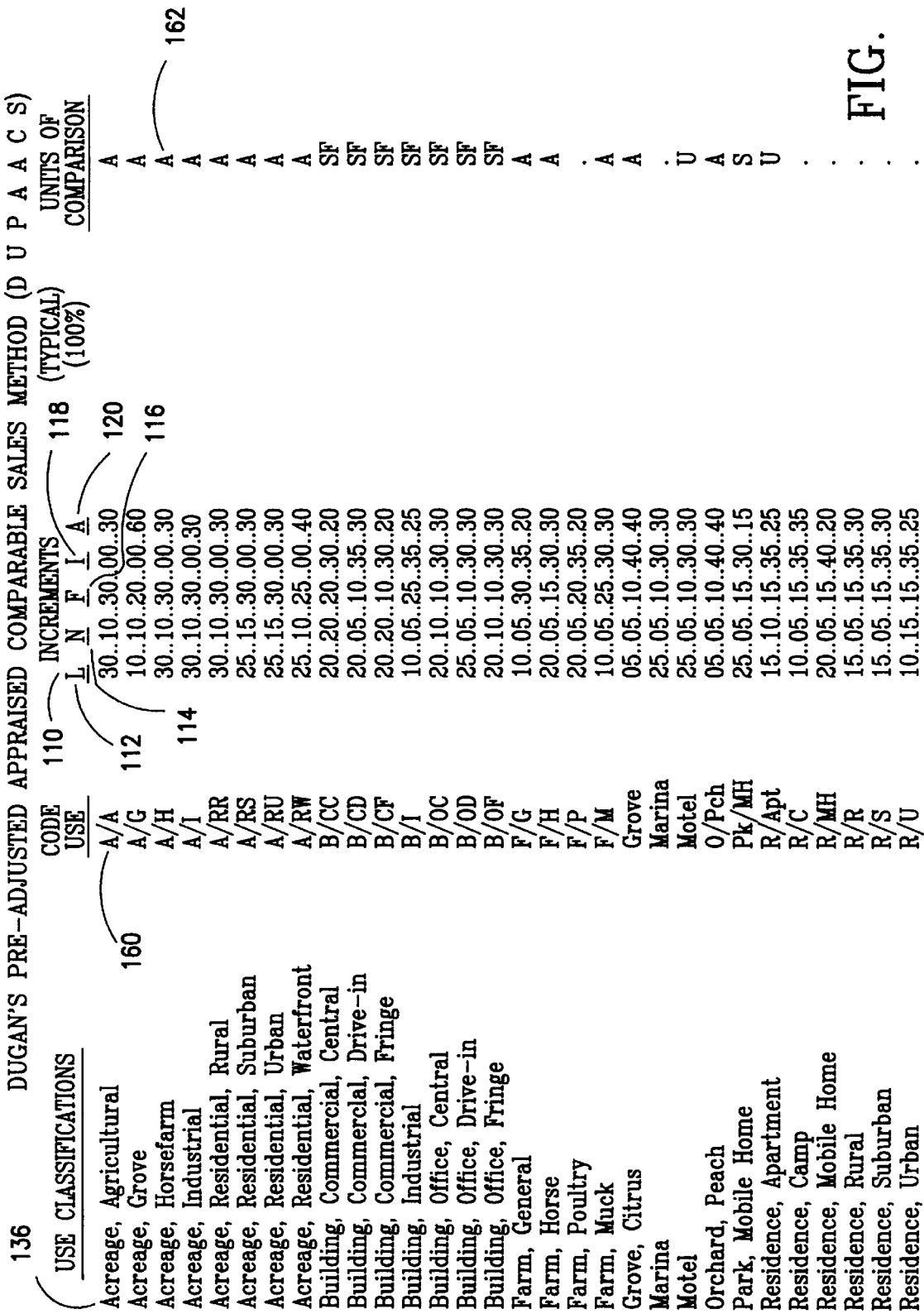

A more complete listing of weights to be attributed to a variety of different use classifications 136 is shown in the table of FIGS. 8a and 8b. Each use classification 136 is associated with a classification code 160. The various categories 110, are listed along the top, and the classifications 136 are listed down the left column. The classification 136 used in the example of FIGS. 6a–6m, Residence, Urban, is listed as the last entry for FIG. 8a and has a code 160 of R/U. Finally, the chart shows the units of comparison 162 used for each classification 136. Suitable codes 160 can be used for the units of comparison 162. As illustrated, A stands for acreage, SF represents square footage, U represents unit, S stands for Site, WFF represents Water Front Footage, and FF represents Front Footage. The classification 136 used in the illustration of FIG. 7a–7i; Acreage, Residential, Rural, is the fifth line down from the top and has a code 160 of A/RR.

The code 160 may be stored in processor 12 in the form of a table having the code 160, classification 136, and weighted values. Thus, when making a data entry to a record, only the code 160 need be entered, and the classification 136, units of comparison 162, and the weighted values will be entered automatically.

Preferably, the appraisal of a subject property is based upon the analysis of from three to five comparable properties. Of course, more or less comparable properties may be used. Accuracy is lost, however, when too few or too many comparable properties are used. For too few comparable properties, there is an insufficiently broad spectrum to account for variation in properties. In contrast, where a large number of comparable properties are used, there is a greater probability that more of the properties will have few similarities with the subject property.

It is also recognized that the system 10 may be configured so that an appraiser is unable to modify records that are stored in database 24. Thus, any records stored at a national database 24, for instance, cannot be tampered with, so as to prevent appraisers from intentionally providing an inaccurate appraisal. Thus, steps 50, 52, 70 and 74 would have to be omitted or modified accordingly. Moreover, after a new record is transmitted to database 24, step 80, the system may be configured to include an approval process by an authorized agent prior to the record being stored in the database 24 at step 82.

The present invention simplifies the comparison of properties in order to assist buyers in locating and valuing subject properties. Properties may be compared that are within a neighborhood or that are in different cities or countries. In addition, appraissals are more uniform since the values are objective and different appraisers will be using the same values when appraising different subject properties. Hence, appraisals are more reliable, cost-effective, and accurate. The system may be used independently, or in conjunction with other appraisal techniques, such as Fannie Mae Forms 2055, 2065 and 2075, Uniform Residential Appraisal Reports, Individual Condo Unit Appraisal Report, and/or Small Residential Income Property Appraisal Report.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. For example, the objective valuation method may be used for any tangible asset, such as for vehicles and specialized commercial equipment. Therefore, it is not desired to limit the invention to the specific examples disclosed or the exact construction and operation shown and described. Rather, all suitable modifications and equivalents may be resorted to, falling within the scope of the invention.

What is claimed is:

1. A computer system for appraising a subject property, comprising:

means for selecting at least one comparable property having a sales price;

means for creating a plurality of categories, each category associated with a feature of the subject property;

means for assigning an ideal value to each category;

means for selecting, for each said comparable property, an appraiser value for each category, the appraiser value being no greater than the ideal value;

means for selecting, for the subject property, a seller value and an appraiser value based upon the seller value for each category, the seller value and appraiser value each being no greater than the ideal value;

means for determining the total appraiser value for each said comparable property and said subject property;

means for determining an adjusted sales price for each said comparable property which represents the relationship between each said comparable property and said subject property based upon the determined total appraiser value for each said comparable property and the total appraiser value for said subject property; and, means for determining an appraised value for the subject property based upon an analysis of the adjusted sales price for each said comparable property.

2. The computer system of claim 1, further comprising a database for storing records, each record comprising information regarding said comparable property and the appraisal value for said comparable property.

3. The computer system of claim 1, wherein a computer processor comprises each means for determining.

4. The computer system of claim 1, further comprising a display screen for displaying information and a manually-operable input unit for receiving commands and information.

5. The computer system of claim 1, further comprising means for displaying the appraisal value.

6. The computer system of claim 1, wherein three to five comparable properties are selected.

7. The computer system of claim 1, wherein the appraiser value is based upon a typical buyer value.

8. A method for appraising a subject property comprising:

selecting at least one comparable property having a sales price;

creating a plurality of categories, each category associated with a feature of the subject property;

assigning an ideal value to each category;

selecting, for each said comparable property, an appraiser value for each category, the appraiser value being no greater than the ideal value;

selecting, for the subject property, a seller value and an appraiser value based upon the seller value for each category, the seller value and appraiser value each being no greater than the ideal value;

determining an adjusted sales price for each said comparable property, the adjusted sales price representing the relationship between each said comparable property and the subject property based upon the selected appraiser values for each said comparable property and the selected appraiser values for the subject property; and, determining an appraised value for the subject property based upon an analysis of the adjusted sales price for each said comparable property.

9. The method of claim 8, wherein the step of selecting an appraiser value is performed at about a time said comparable property is sold and the step of determining an adjusted sales price for each said comparable property is performed after a subject property is selected.

10. The method of claim 8, further comprising the step of displaying the determined appraisal value.

11. The method of claim 8, further comprising the step of determining the total appraiser value for each said comparable property and for the subject property and wherein the step of determining an adjusted sales prices comprises the step of determining an adjusted sales price for each said comparable property, the adjusted sales price representing the relationship between each said comparable property and the subject property based upon the determined total appraiser value for each said comparable property and the total appraiser value for the subject property.

12. The method of claim 8, wherein three to five comparable properties are selected.

13. The method of claim 8, wherein the appraiser value is based upon a typical buyer's value.

14. A method for appraising a subject property comprising:

selecting at least one comparable property, each at least one comparable property having a sales price;

creating a plurality of categories, each category associated with a feature of the subject property;

assigning an ideal value to each category;

selecting, for each said comparable property and the subject property, an input value for each category, the input value being no greater than the ideal value;

determining an appraised value for the subject property based upon an analysis of the input values for each said comparable property and the subject property.

* * * * *